United States Patent [19]
Hieda

[11] Patent Number: 5,087,978
[45] Date of Patent: Feb. 11, 1992

[54] CAMERA SYSTEM AND INTERCHANGEABLE LENS

[75] Inventor: Teruo Hieda, Kanagawa, Japan

[73] Assignee: Canon Kabushiki Kaisha, Tokyo, Japan

[21] Appl. No.: 701,304

[22] Filed: May 13, 1991

Related U.S. Application Data

[63] Continuation of Ser. No. 392,883, Aug. 14, 1989, abandoned.

[30] Foreign Application Priority Data

Sep. 5, 1988 [JP] Japan .................. 63-220370
Nov. 30, 1988 [JP] Japan .................. 63-300849

[51] Int. Cl.⁵ ............... H04N 5/238; H04N 5/225; G02B 13/16; G03B 17/00
[52] U.S. Cl. .................. 358/228; 358/225; 354/286
[58] Field of Search ............ 358/228, 225, 98; 354/286

[56] References Cited

U.S. PATENT DOCUMENTS

| | | | |
|---|---|---|---|
| 4,639,112 | 1/1987 | Nakai et al. | 354/286 |
| 4,682,871 | 7/1987 | Metabi | 354/286 |
| 4,748,467 | 5/1988 | Maekawa et al. | 354/286 |
| 4,803,509 | 2/1989 | Nakai et al. | 354/286 |
| 4,814,802 | 3/1989 | Ogawa | 354/286 |
| 4,845,555 | 7/1989 | Yabe et al. | 358/98 |
| 4,855,814 | 8/1989 | Shiraishi et al. | 358/225 |
| 4,860,113 | 8/1989 | Miyamoto et al. | 358/225 |
| 4,868,646 | 9/1989 | Tsaji | 358/98 |
| 4,878,076 | 10/1989 | Taniguchi et al. | 354/286 |

*Primary Examiner*—Howard W. Britton
*Assistant Examiner*—Wendy R. Greening
*Attorney, Agent, or Firm*—Robin, Blecker, Daley & Driscoll

[57] ABSTRACT

A camera system with an interchangeable lens, including a memory for storing discrimination data for discriminating characteristics of a diaphragm, the memory being provided in the lens unit. Control characteristics of the diaphragm are adjusted inside the camera body on the basis of the discrimination data. Discrimination data on the characteristics of the diaphragm and/or control data according to the characteristics of the diaphragm are stored in the memory of the interchangeable lens.

30 Claims, 7 Drawing Sheets

CAMERA SYSTEM AND INTERCHANGEABLE LENS

This is a continuation application under 37 CFR 1.62 of prior application Ser. No. 392,883, filed Aug. 14, 1989 now abandoned.

BACKGROUND OF THE INVENTION

1. Field of the Invention

This invention relates to a camera system capable of interchanging lenses and/or an interchangeable lens.

2. Description of the Related Art

Apart from single-lens reflex cameras using silver-halide films, camera systems in which a lens and a camera body are detachably connected and in which a plurality of interchangeable lenses can be utilized are known in the field of video cameras. In lens-interchange systems, an interchangeable lens has a photographic lens, a zoom drive section, a diaphragm, a diaphragm drive mechanism and a mount portion. The mount portion of the interchangeable lens is mechanically coupled with the mating mount portion of the camera body, thereby being mounted thereon.

Also, there are well-known systems for exchanging signals representing aperture information and automatic focusing control information and the like between an interchangeable lens and the camera body. In such systems, electrical connection between signal lines of the lens and the camera body is established by connecting electric contacts of the mating mount portions or by employing an external cable or connector.

A plurality of types of lens different from each other in focal length, zoom ratio, F number and so on are provided as interchangeable lenses.

Although the conventional camera systems have satisfactory performance of establishing mechanical, electrical and optical connections between the lens and the camera body conventional camera systems entail a problem relating to the diaphragm and the mechanism for driving the same, as described below. A suitable one of various types of driving systems (e.g., a servo motor system, a pulse motor system, and an IG meter system) is selected for the diaphragm drive mechanism according to the type of lens, the F number, the zoom ratio, the image size and so on. Even in one driving system, each of the number of diaphragm blades, the mass of the same thereof, the torque of the motor, the rotational speed of the motor varies, and the control characteristics must be changed accordingly.

The diaphragm and the diaphragm drive mechanism can be designed in conformity with one standard with respect to DC operating characteristics, but, in particular, a common design of components having different dynamic characteristics is not only difficult but disadvantageous because it greatly increases the production cost and may result in failure to utilize specific features of each type of system.

In the field of video cameras, therefore, the diaphragm control characteristics or, more specifically dynamic characteristics among the same are manually controlled on the side of the camera body each time the lens is interchanged.

SUMMARY OF THE INVENTION

It is an object of the present invention to provide a camera system and an interchangeable lens in which system the lens can be easily interchanged.

The present invention provides in one of its aspects a camera system capable of freely interchanging lenses, including a memory which is provided in a lens unit and in which discrimination data for discriminating diaphragm characteristics is stored. A diaphragm control characteristic is adjusted inside the camera body on the basis of the discrimination data.

The present invention provides in another of its aspects an interchangeable lens having a memory means for storing data for discriminating diaphragm characteristics and/or control data according to the diaphragm characteristics.

In accordance with the present invention, the camera body is informed of the diaphragm characteristics of the individual interchangeable lens by referring to the memory in the interchangeable lens, and diaphragm control for the interchangeable lens can be automatically changed according to the diaphragm characteristics. Either of interchangeable lenses having various characteristics can be readily used with one camera body. There is no need for manually adjusting control parameters each time the lens is interchanged.

Other objects and features of the present invention will become apparent upon reading the following description in conjunction with the accompanying drawings.

DETAILED DESCRIPTION OF THE PREFERRED EMBODIMENTS

Figure 1:
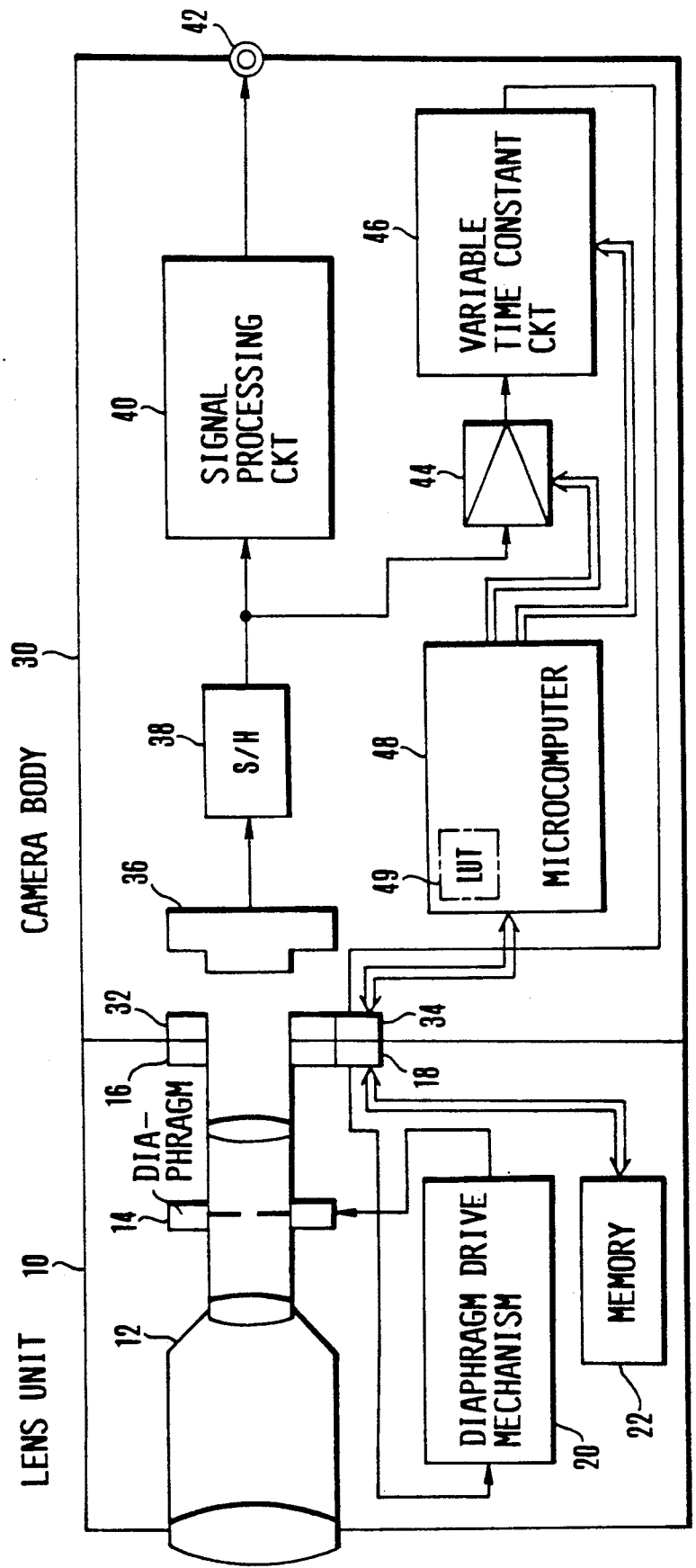
FIG. 1 is a block diagram of an embodiment of the present invention.

FIG. 1 shows a block diagram of a camera system which represents an embodiment of the present invention. The camera system has a lens unit 10 and a camera body 30. The lens unit 10 includes a photographic optical system, a diaphragm 14, a mount 16, an electric contact 18 provided in the mount 16, a diaphragm drive mechanism 20, and a memory 22 in which data for discriminating diaphragm characteristics based on the types of the diaphragm 14 and the diaphragm drive mechanism 20 has been written. The camera body 30 includes a mount 32 capable of being detachably fitted and attached to the mount 16 of the lens unit 10, an electric contact 34 having the electric contact 18 of the lens unit 10 and capable of being electrically connected to the electric contact 18 when the lens unit 10 is attached to the camera body 30, an imaging device 36, a sample-and-hold (S/H) circuit 38 for sampling and holding an output of the imaging device 36, a signal processing circuit 40 for processing a signal output from the S/H circuit 38 and outputting a video signal, a video output terminal 42, a variable gain amplifier 44 provided as a diaphragm characteristic varying means of this embodiment, a variable time constant circuit 46 provided as another diaphragm characteristic varying means, and a microcomputer 48.

In the state where the mount 16 of the lens unit 10 is mechanically connected to the mount 32 of the camera body 30, the electric contact 18 is in contact with the electric contact 34 and electrical connection is thereby established between the lens section 10 and the camera body 30. During this electrical connection, the microcomputer 48 reads out the data relating to the diaphragm drive mechanism and so on and stored in the memory 22, and controls the gain of the amplifier 44 and the time constant of the variable time constant circuit 46 in accordance with the stored data.

The microcomputer 48 has a memory such as an LUP (lock-up table) 49 in which control data for compensating the diaphragm characteristics by varying the above gain and time constant in accordance with the data stored in the memory 22.

An image of the object is imaged on the imaging device 36 by introducing the light of the image through the photographic optical system 12, restricting the amount of light by the diaphragm 14, and introducing the light of the image through the openings of the mounts 16 and 32 to the imaging device 36. The imaging device 36 outputs a photo-electric conversion signal, and the S/H circuits 38 extracts signal components therefrom and supplies the same to the signal processing circuit 40. The signal processing circuit 40 supplies the video signal to the output terminal 42. The output of the S/H circuit 38 is first amplified by the amplifier 44 at a predetermined gain and is supplied to the diaphragm drive mechanism 20 via the variable time constant circuit 46 and the electric contacts 34 and 18. The diaphragm drive mechanism 20 controls the amount of image light introduced to the imaging device 36 by controlling the aperture of the diaphragm 14 in accordance with the input signal received from the contact 18, and thereby controls the output level of the S/H circuit 38 to be set to an optimum value. As mentioned above, the gain of the amplifier 44 and the time constant of the variable time constant circuit 46 are adjusted by the microcomputer 48 to values according to the diaphragm characteristic data stored in the lens unit 10.

Figure 2:
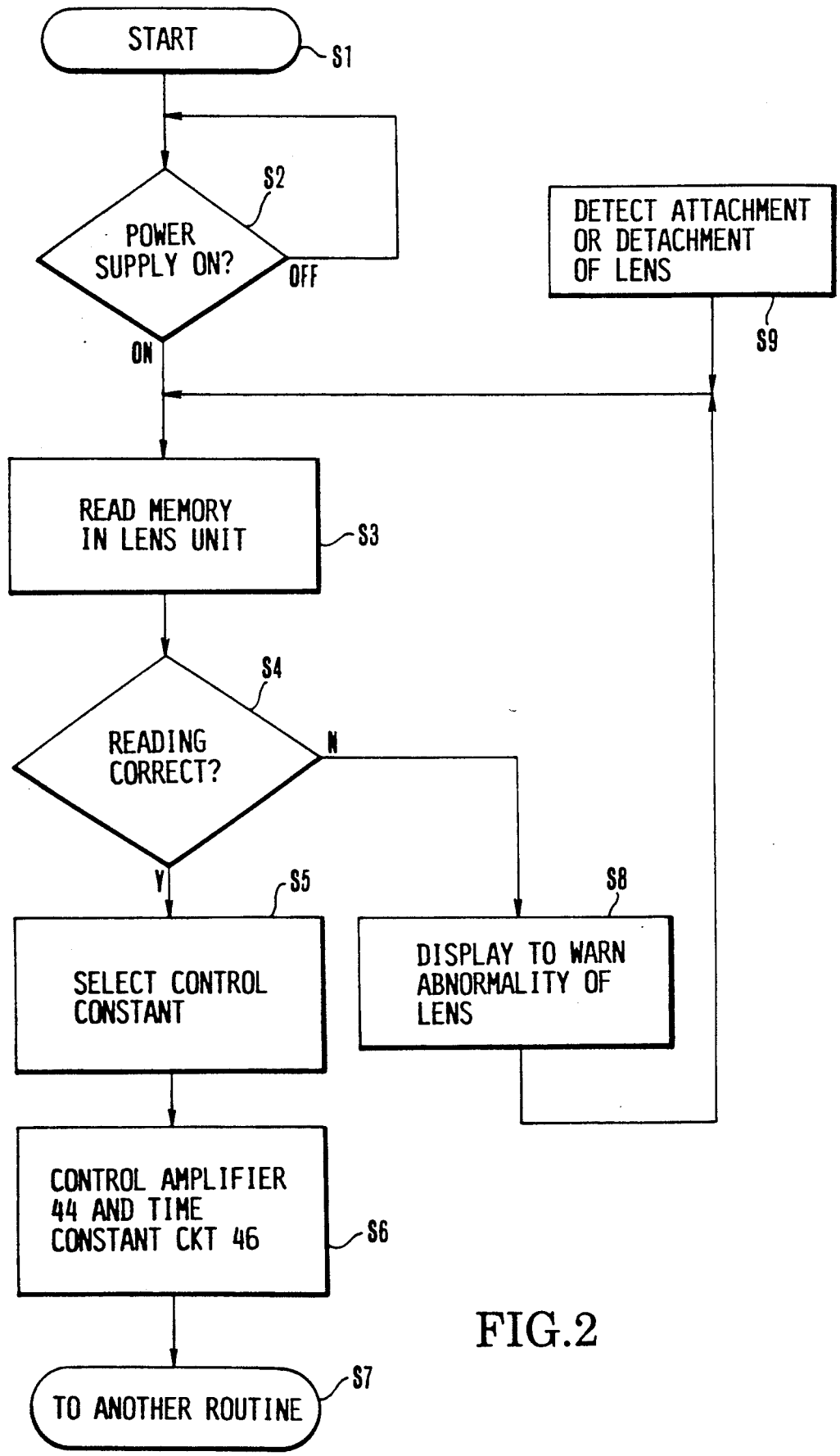
FIG. 2 is a flow chart of sequential operation of a microcomputer shown in FIG. 1.

FIG. 2 shows a flow chart of the operation of the microcomputer 48. When the process is started (step S1), examination is made as to whether or not the power supply is on or off. If it is in the off state, a wait for the on state is performed (step S2). If the power supply is in the on state, the data stored in the memory 22 of the lens unit 10 is read out (step S3), and examination is made as to whether or not the read data is correct (step S4). If the data is correct, data items suitable for the lens unit 10 attached, that is, data items corresponding to the specific characteristics of the lens unit 10 are selected from the data written in the internal memory of the microcomputer 48 (step S5). The gain of the amplifier 44 and the time constant of the variable time constant circuit 46 are adjusted in accordance with the selected data items (step S6). Thereafter, the process proceeds to another routine (step S7). If the read data is found to be incorrect as a result of examination in step S4, it is determined that the lens unit 10 is not connected or that the state of the connection is defective, a display is made to warn the abnormality of the lens unit 10 and the process returns to step S3 (in step S8).

During any other different routine, the process proceeds to step S3 to read the memory 22 of the lens unit 10 with priority if detachment or attachment of the lens unit 10 is detected.

Figure 3:
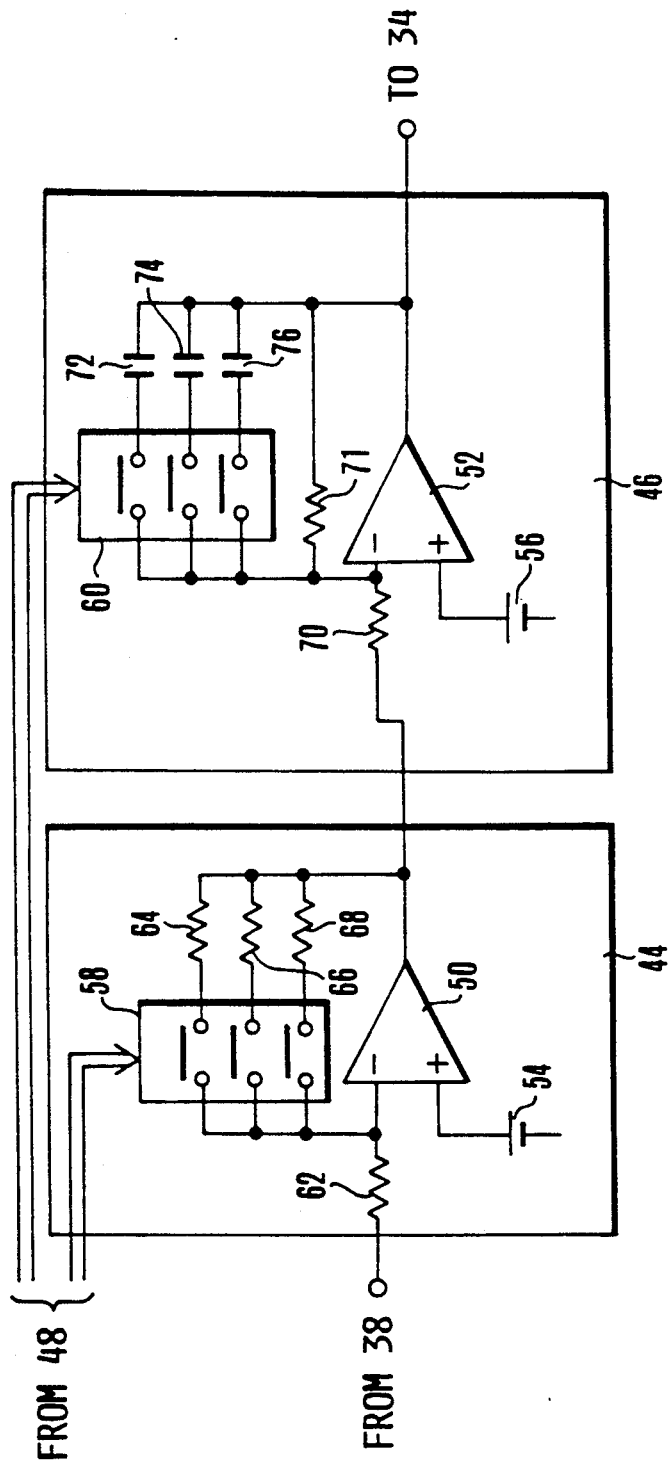
FIG. 3 is a block diagram of a section including an amplifier and a variable time constant circuit shown in FIG. 1.

FIG. 3 shows a block diagram of an example of the construction including the amplifier 44 and the variable time constant circuit 46. This circuit arrangement has operational amplifiers 50 and 52, reference voltages 54 and 56, switch circuits 58 and 60, resistors 62, 64, 66, 68, 70 and 71, and capacitors 72, 74 and 76. The switch circuits 58 and 60 are controlled and changed over by the microcomputer 48. One or more of the resistors 64, 66 and 68 are selected by the switch circuit 58, thereby changing the gain of the amplifier 44. One or more of the capacitors 72, 74 and 76 are selected by the switch circuits 60, thereby changing the time constant of the variable time constant circuit 46.

In the arrangement shown in FIG. 3, some of the three elements is selected to dispersively change the gain and the time constant, but, needless to say, the number of such elements is not limited to three and the gain and/or the time constant may be continuously changed.

As can be easily understood from the above description, in this embodiment, the diaphragm characteristics of the individual interchangeable lens attached to the camera body are known on the side of the camera body, thereby enabling the performance of controlling the diaphragm of the interchangeable lens to be automatically changed according to the diaphragm characteristics. Consequently, interchangeable lenses having various characteristics can be selectively used with one camera body and can be interchanged quickly because there is no need for any manual adjustment.

In the embodiment illustrated in FIG. 1, the data stored in the memory 22 of the lens unit 10 is read out by the microcomputer 48 of the camera body 30. Instead, the desired data may be transmitted from the lens unit 10 to the camera body 30 in response to a command from the camera body 30 by a circuitry such as a memory control circuit or a microcomputer which is provided in the lens unit 10 and which is capable of reading out the data stored in the memory 22 and transmitting this data to the camera body 30.

Figure 4:
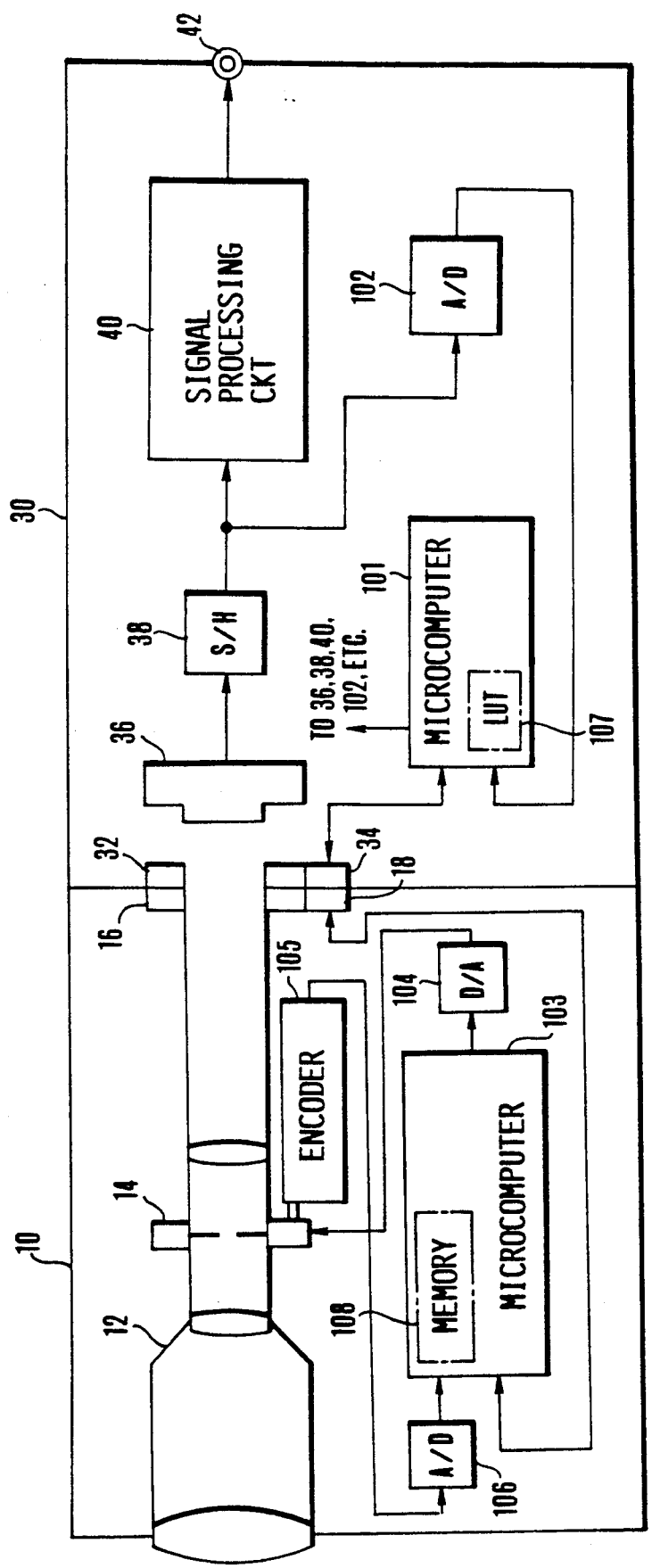
FIG. 4 is a block diagram of another embodiment of the present invention.

FIG. 4 shows a block diagram of another embodiment of the present invention having a similar construction. Components of this embodiment identical or corresponding to those shown in FIG. 1 are designated with the same reference numerals.

A microcomputer 101 and an A/D converter 102 are provided in the camera body 30. The microcomputer 101 controls circuits in the camera body 30 (e.g., imaging device 36, S/H circuit 38, signal processing circuit 40, A/D converter 102 and so on). The lens unit 10 has a microcomputer 103 containing in its internal memory 108 data on the diaphragm time constant relating to the diaphragm characteristics, a D/A converter 104, an encoder 105 mechanically connected to the diaphragm 14 and capable of reading the angular aperture of the diaphragm 14, and an A/D converter 106.

As in the case of the arrangement of FIG. 1, a video signal produced by the imaging device 36 is supplied to the A/D converter 102 via the S/H circuit 38 and is thereby converted into a digital signal which is supplied to the microcomputer 101.

The microcomputer 101 has a bidirectional serial communication line and is capable of exchanging signals between itself and the microcomputer 103 of the lens unit 10 via the serial communication line. The microcomputer 101 reads the desired data relating to the diaphragm characteristics from the microcomputer 103. The microcomputer 101 produces diaphragm control data on the basis of the output of the A/D converter 102 and the data read out of the microcomputer 103 supplies the diaphragm control data to the microcomputer 103. The microcomputer 103 produces diaphragm drive data on the basis of the diaphragm control data supplied via the serial communication line and the output of the A/D converter 106 and supplies the diaphragm drive data to the D/A converter 104. The diaphragm 14 is controlled by the output of the D/A converter 104. The angular aperture of the diaphragm 14 is converted into an electric signal by the encoder 105, is further converted into a digital signal by the A/D converter 106, and is supplied to the microcomputer 103 as the data on the actual diaphragm position, as mentioned above.

The above-mentioned control data in accordance with the present invention includes, for example, the diaphragm position of the diaphragm 14 determined on the basis of the output of the A/D converter 102 and the data on the diaphragm characteristics. The microcomputer 103 may produce the diaphragm drive data to drive the diaphragm 14 so that the diaphragm position designated by the control data and the actual diaphragm position represented by the signal supplied from the A/D converter 106 coincide with each other, as described later.

The control data is produced by the microcomputer 101 in such a manner that the optimum control data is selected from the data in the LUT 107 on the basis of the output of the A/D converter 102 and the data on the diaphragm characteristics.

Figure 5:
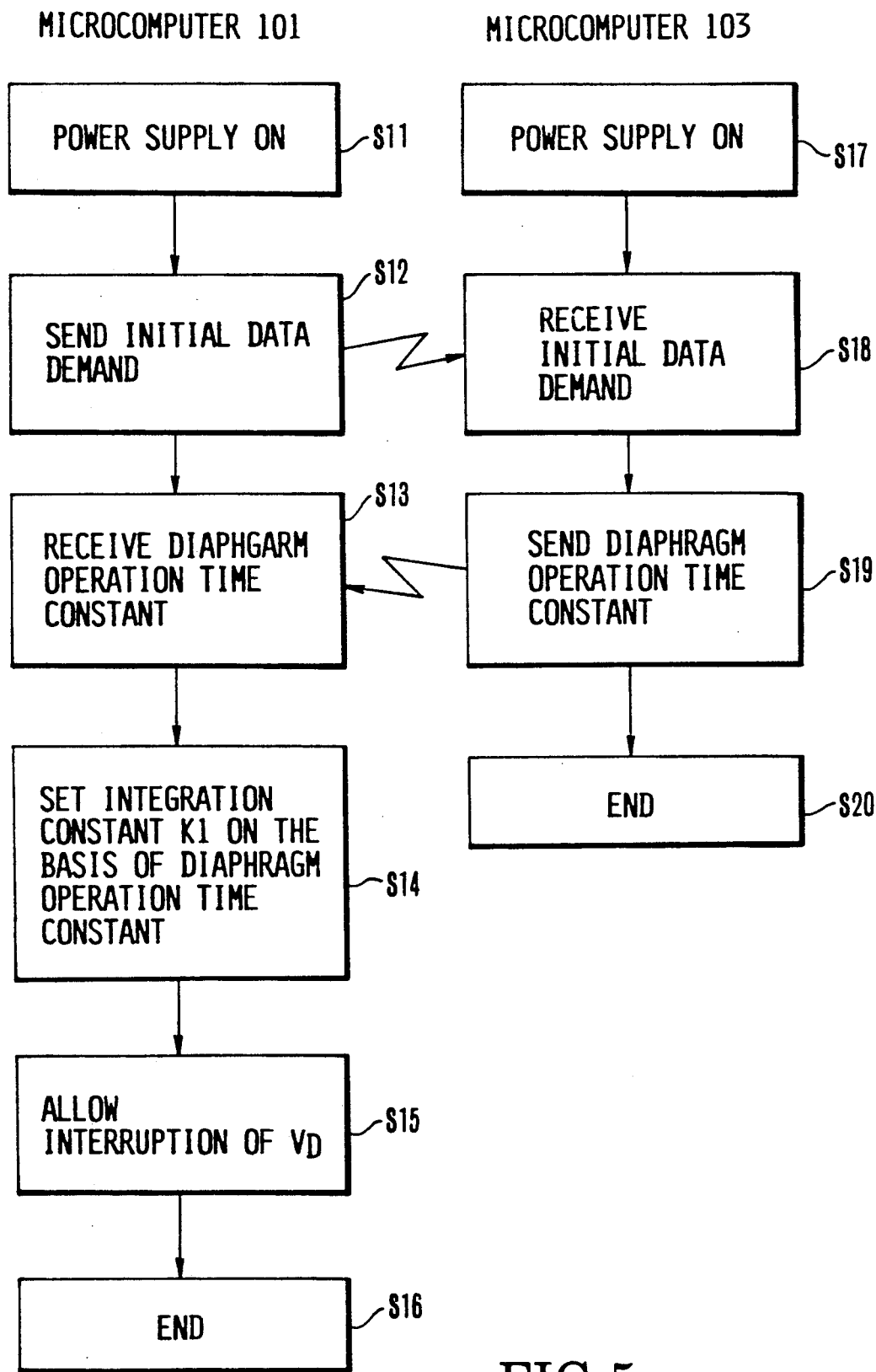
FIGS. 5 to 7 are flow charts of sequential operations of microcomputers shown in FIG. 4.
Figure 6:
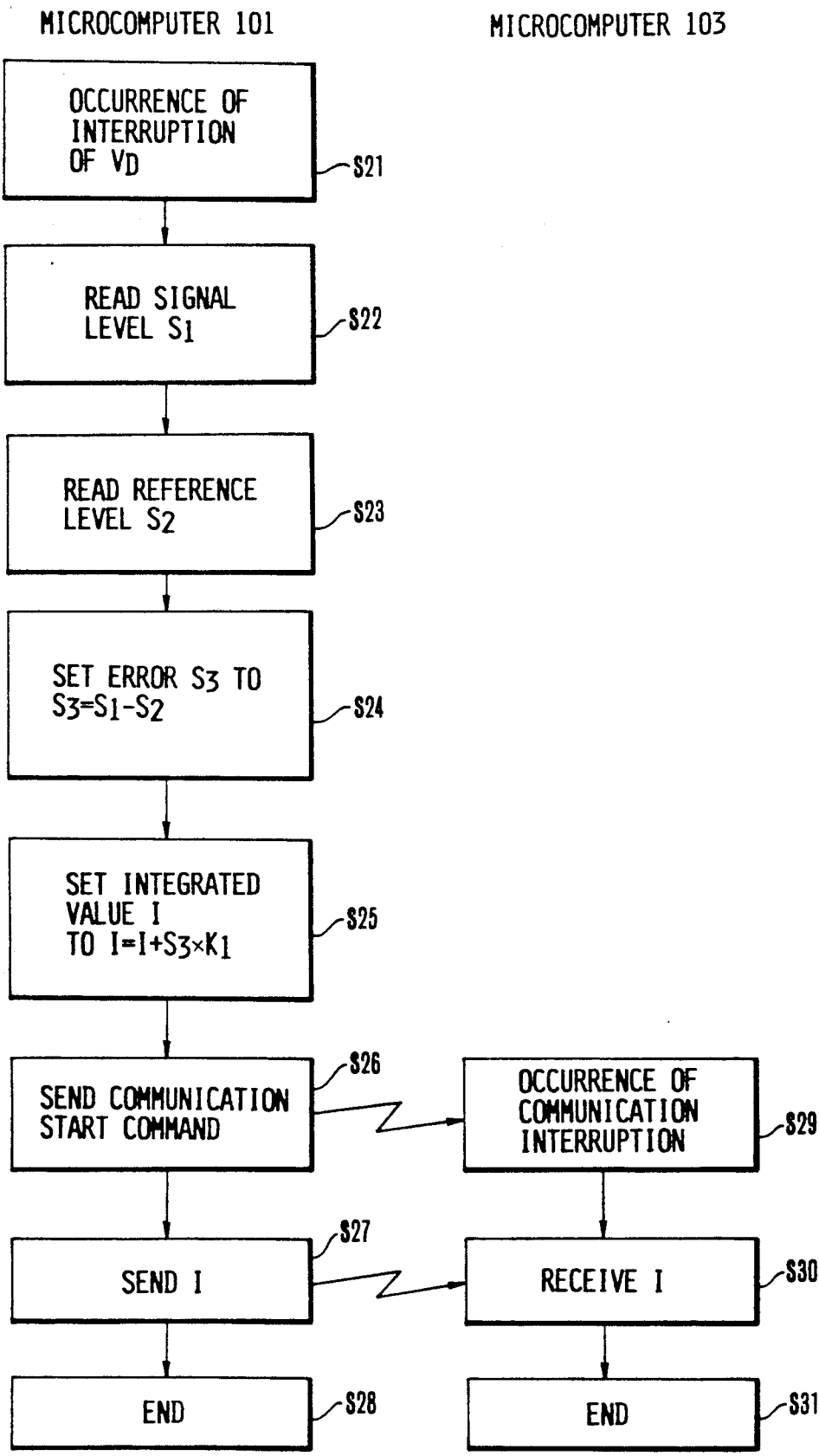
Figure 7:
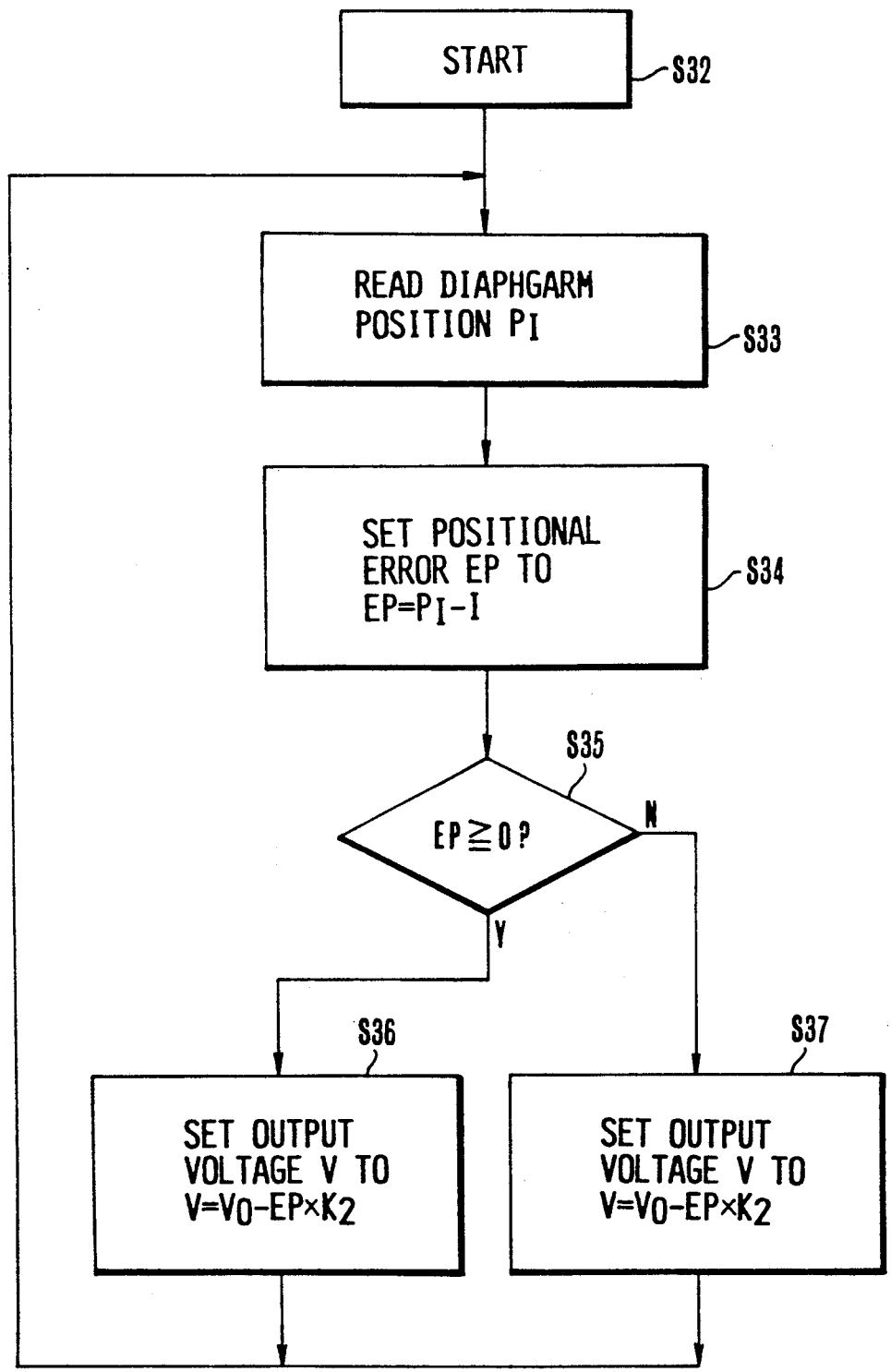

FIGS. 5 to 7 show operation sequence flow charts of the operations of the microcomputer 101 of the camera body 30 and the microcomputer 103 of the lens unit shown in FIG. 4. The arrows that connect the flows designate communication through the above-mentioned serial signal line.

FIG. 5 shows a flow chart of an operation sequence after the power supply has been started. The microcomputer 101 of the camera body 30 sends a demand for initial data in step S12 after the power supply has been started in step S11. The microcomputer 101 receives a diaphragm operation time constant in step S13, sets an integration constant $K_1$ in step S14 on the basis of the diaphragm operation time constant by using the predetermined look-up table, and allows interruption of a vertical synchronizing signal $V_D$ in step S15, and stops operating in step S16.

On the other hand, the microcomputer 103 of the lens unit receives the initial data demand from the microcomputer 101 of the camera body 30 in step S18 after the power supply has been started in step S17, sends in step S19 the data on the diaphragm operation time constant specific to the lens unit 10 or to the type of the lens unit 10 written in the memory 108 of the microcomputer 103, and stops operating in step S20.

FIG. 6 shows a flow chart of operation sequence used when interruption of the vertical synchronizing signal $V_D$ takes place in the microcomputer 101 of the camera body 30. The microcomputer 101 reads a signal level $S_1$ from the A/D converter 102 in step S22 if interruption of the vertical synchronizing signal $V_D$ takes place in step S21. The microcomputer 101 then reads a predetermined reference level $S_2$ corresponding to the optimum angular aperture of the diaphragm 14 from the memory 108 in step S23, calculates $S_3 = S_1 - S_2$ to obtain an error $S_3$ in step S24, calculates $I = I + S_3 \times K_1$ to obtain an integrated value I (representing the diaphragm position) in step S25, sends in step S26 a code to the microcomputer 103 of the lens unit 10 to start communication, sends the integrated value I in step S27, and stops operating in step S28.

When the microcomputer 103 of the lens unit 10 receives the communication starting code, communication interruption takes place in step S29. The microcomputer 103 receives the integrated value I in step S30 and stops operating in step S31.

FIG. 7 shows a sequence flow chart of the diaphragm driving operation of the microcomputer 103 of the lens unit 10. The operation is started in step S32, and the actual diaphragm position $P_I$ output from the A/D converter 106 is read in step S33. A positional error EP is obtained as $EP = P_I - I$ in step S34, and the process branches in step S35 depending upon whether or not the positional error EP is positive or negative. If EP>0 (Yes), the output voltage V is set to $V = -V_0 - EP \times K_2$ in step S36. $V_0$ is a voltage corresponding to the loss due to friction of the diaphragm 14, and $K_2$ is a constant determined by the operation constant of the diaphragm 14. If EP<0 (No), the output voltage V is set to $V = V_0 - EP \times K_2$ in step S37.

In the embodiment illustrated in FIG. 1, the gain and the time constant are adjusted for transmission of a diaphragm control signal from the camera body 30 to the lens unit 10. Instead, other control values, e.g., one or more of error detection gain, phase characteristics, delay time, maximum control width, insensible band width and so on.

The diaphragm control may be based on the partial light metering and the peak detection unlike the system illustrated in FIG. 1. The data stored in the memory 22 may include a code for discriminating the diaphragm control system and the absolute value and/or relative value of a control constant (control data) of the diaphragm control loop. A plurality of control constants may also be stored.

The angular aperture of the diaphragm 14 is read by the encoder 105 in the second embodiment illustrated in FIG. 4, but the invention is not limited to this type. The diaphragm may be driven by a pulse motor, and a value obtained by integrating driving pulses may be used to control the diaphragm. In the above-described embodiment, the image signal is directly converted into a digital signal by the A/D converter 10. Instead, the image signal may preliminarily undergo smoothing, integration, sampling and holding, or peak detection before it undergoes A/D conversion. In the above description, the operations of the microcomputer 101 of the camera body and the microcomputer 103 of the lens unit are based on the flow charts of FIGS. 5 to 7. However, the distribution of operations between these two microcomputers is not limited as shown in the flow charts and, needless to say, certain operations shown in the flow charts are interchangeable.

In accordance with the present invention, as can be easily understood from the above description, the diaphragm characteristics of the individual interchangeable lens attached to the camera body are known on the side of the camera body, and the diaphragm control for the interchangeable lens can be automatically changed on the basis of the diaphragm characteristics. It is thereby possible to use, with one camera body 30, one of interchangeable lenses 10 having various characteristics and also possible to interchange the lenses quickly because the need for manual adjustment is eliminated.

The diaphragm 14 is controlled so that the angular aperture is determined in accordance with the signal input into the microcomputer 103 of the lens unit. The angular aperture of the diaphragm 14 can therefore be known on the side of the camera body 30 from the data supplied to the present lens without reading the output of the encoder 105 representing the diaphragm 14. It is possible to display, by using this data, the present angular aperture in an electronic viewfinder or the like.

In a case where the diaphragm control is effected manually, it is sufficient to send a value corresponding to the voltage generated by a variable resistor or the like to the microcomputer 103 of the lens unit. Since, as described above, the value output from the microcomputer 101 of the camera body corresponds to the angular aperture of the diaphragm 14, the characteristics of control of the diaphragm 14 can be varied according to the angular aperture. Since the coefficient of control of the diaphragm 14 is set by the software, there is no possibility of errors in the adjustment values including the time constant and the gain due to the impedance of the switch circuit, thereby enabling the control to be effected with accuracy.

In accordance with the present invention, as described above, the diaphragm characteristics of the individual interchangeable lens attached to the camera body are known on the side of the camera body, thereby enabling the diaphragm control for the interchangeable lens to be automatically changed on the basis of the diaphragm characteristics. It is therefore possible to readily use interchangeable lenses of various characteristics with one camera body while eliminating the need for manually adjusting the parameters each time the lens is interchanged.

What is claimed is:

1. A camera system capable of freely interchanging lenses, comprising a camera body, a lens unit, and a memory for storing discrimination data for discriminating operational characteristics of a diaphragm, said memory being provided in said lens unit, wherein characteristics of control of the diaphragm are adjusted inside said camera body on the basis of the discrimination data.

2. An interchangeable lens comprising a memory storing data selected from the group consisting of data for discriminating operational characteristics of a diaphragm, control data and combinations thereof according to the operational characteristics of the diaphragm.

3. A camera system and an interchangeable lens, comprising a camera body and a memory for storing discrimination data for discriminating operational characteristics of a diaphragm, said memory being provided in said lens unit, wherein characteristics of control of the diaphragm are adjusted inside said camera body on the basis of the discrimination data.

4. A camera system and an interchangeable lens according to claim 3, further comprising memory means for storing data selected from the group consisting of data for discriminating operational characteristics of the diaphragm, control data and combinations thereof according to the operational characteristics of the diaphragm.

5. A camera system capable of interchanging lenses, comprising:
a camera body;
a lens unit;
a memory provided in said lens unit, for storing discrimination data for discriminating characteristics of a diaphragm;
diaphragm characteristic varying means provided in said camera body, for varying an electric characteristic to vary characteristics of control of the diaphragm; and
control means for varying and adjusting, on the basis of the discrimination data, the electric characteristic relating to the control of the diaphragm effected by said diaphragm characteristic varying means.

6. A camera system according to claim 5, wherein said control means has a memory relating to control data according to the operational characteristics of the diaphragm.

7. A camera system according to claim 5, wherein said diaphragm characteristic varying means includes a variable gain amplifier and a variable time constant circuit.

8. A camera system and an interchangeable lens, comprising:
a camera body;
diaphragm means provided in said lens unit, for driving a diaphragm;
first control means provided in said lens unit and having a memory for storing discrimination data for discriminating operational characteristics of the diaphragm, for controlling and driving said diaphragm means; and
second control means provided in said camera body, for supplying control data for controlling and driving said diaphragm means to said first control means on the basis of said discrimination data;
wherein said first control means controls said diaphragm means on the basis of the control data supplied from said second control means.

9. A camera system and an interchangeable lens according to claim 3, further comprising a look-up table relating to control data based on an output level of a video signal in accordance with photographing light from an object and on data supplied from said memory.

10. A camera system and an interchangeable lens according to claim 9, further comprising a feedback loop for detecting an actual angular aperture of the diaphragm and effecting control of the diaphragm by comparing data on the detected angular aperture and the control data with each other.

11. A camera system according to claim 7, wherein said variable gain amplifier includes an operational amplifier, a plurality of resistors for varying a gain of said operational amplifier, and a switch circuit for selectively connecting at least one of said plurality of resistors to said operational amplifier, and wherein said control means changes over said switch circuit to vary the gain of said operational amplifier.

12. A camera system according to claim 7, wherein said variable time constant circuit includes an operational amplifier, a resistor and a plurality of capacitors constituting an integration circuit, and a switch circuit for selectively connecting at least one of said plurality of capacitors to said resistor to constitute the integration circuit, and wherein said control means changes over said switch circuit to vary a time constant of the integration circuit.

13. A camera system and an interchangeable lens according to claim 8, wherein said first control means includes a microcomputer and detection means for detecting data on the angular aperture.

14. An interchangeable lens according to claim 2, wherein said control data includes data selected from the group consisting of amplification gain data, time constant data, error detection gain data, phase characteristics data, delay time data, maximum control width data non-sensitive zone width data and combinations thereof.

15. An interchangeable lens, comprising a memory for memorizing data concerning operational characteristics of a diaphragm, and memory control means for reading and outputting said data from the memory at a predetermined timing.

16. An interchangeable lens according to claim 15, wherein said control data includes at least one of amplification gain, time constant, error detection gain, phase characteristics, delay time, maximum control width and non-sensitive zone width.

17. An interchangeable lens according to claim 15, wherein said predetermined timing is one synchronized with a vertical synchronizing signal.

18. An interchangeable lens according to claim 15, wherein said memory control means includes a microcomputer.

19. A camera system capable of freely interchanging lenses, comprising a camera body, a lens unit, and a memory for storing discrimination data for discriminating response characteristics of a diaphragm, said memory being provided in said lens unit, wherein characteristics of control of the diaphragm are adjusted inside said camera body on the basis of the discrimination data.

20. An interchangeable lens comprising a memory storing data selected from the group consisting of data for discriminating response characteristics of a diaphragm, control data and combinations thereof according to the response characteristics of the diaphragm.

21. A camera system and an interchangeable lens, comprising a camera body and a memory for storing discrimination data for discriminating response characteristics of a diaphragm, said memory being provided in said lens unit, wherein characteristics of control of the diaphragm are adjusted inside said camera body on the basis of the discrimination data.

22. A camera system capable of interchanging lenses, comprising:
a camera body;
a lens unit;
a memory provided in said lens unit, for storing discrimination data for discriminating response characteristics of a diaphragm;
diaphragm characteristic varying means provided in said camera body, for varying an electric characteristic to vary characteristics of control of the diaphragm; and
control means for varying and adjusting, on the basis of the discrimination data, the electric characteristic relating to the control of the diaphragm effected by said diaphragm characteristic varying means.

23. A camera system and an interchangeable lens, comprising:
a camera body;
diaphragm means provided in said lens unit, for driving a diaphragm;
first control means provided in said lens unit and having a memory for storing discrimination data for discriminating response characteristics of the diaphragm, for controlling and driving said diaphragm means; and
second control means provided in said camera body, for supplying control data for controlling and driving said diaphragm means to said first control means on the basis of said discrimination data;
wherein said first control means controls said diaphragm means on the basis of the control data supplied from said second control means.

24. An interchangeable lens, comprising a memory for memorizing data concerning response characteristics of a diaphragm, and memory control means for reading and outputting said data from the memory at a predetermined timing.

25. A camera system capable of freely interchanging lenses, comprising a camera body, a lens unit, and a memory for storing discrimination data for discriminating drive characteristics of a diaphragm, said memory being provided in said lens unit, wherein characteristics of control of the diaphragm are adjusted inside said camera body on the basis of the discrimination data.

26. An interchangeable lens comprising a memory storing data selected from the group consisting of data for discriminating drive characteristics of a diaphragm, control data and combinations thereof according to the characteristics of the diaphragm.

27. A camera system and an interchangeable lens, comprising a camera body and a memory for storing discrimination data for discriminating drive characteristics of a diaphragm, said memory being provided in said lens unit, wherein characteristics of control of the diaphragm are adjusted inside said camera body on the basis of the discrimination data.

28. A camera system capable of interchanging lenses, comprising:
a camera body;
a lens unit;
a memory provided in said lens unit, for storing discrimination data for discriminating drive characteristics of a diaphragm;
diaphragm characteristic varying means provided in said camera body, for varying an electric characteristic to vary characteristics of control of the diaphragm; and
control means for varying and adjusting, on the basis of the discrimination data, the electric characteristic relating to the control of the diaphragm effected by said diaphragm characteristic varying means.

29. A camera system and an interchangeable lens, comprising:
a camera body;
diaphragm means provided in said lens unit, for driving a diaphragm;
first control means provided in said lens unit and having a memory for storing discrimination data for discriminating response characteristics of the diaphragm, for controlling and driving said diaphragm means; and
second control means provided in said camera body, for supplying control data for controlling and driving said diaphragm means to said first control means on the basis of said discrimination data;
wherein said first control means controls said diaphragm means on the basis of the control data supplied from said second control means.

30. An interchangeable lens, comprising a memory for memorizing data concerning drive characteristics of a diaphragm, and memory control means for reading and outputting said data from the memory at a predetermined timing.

* * * * *

UNITED STATES PATENT AND TRADEMARK OFFICE
CERTIFICATE OF CORRECTION

PATENT NO. : 5,087,978
DATED      : February 11, 1992
INVENTOR(S) : Teruo Hieda

It is certified that error appears in the above-identified patent and that said Letters Patent is hereby corrected as shown below:

IN THE DRAWINGS

FIG. 5.   Change "DIAPHGARM" to -- DIAPHRAGM --

FIG. 7.   Chagne "DIAPHGARM" to -- DIAPHRAGM --

Col. 4, line 15.   Change "is" to -- are --

Col. 6, line 15.   Change "EP > 0" to -- EP $\geq$ 0 --

Col. 7, line 67.   After "discriminating" insert -- operational --

Col. 9, line 3.    After "data" first occurrence insert -- , --

Signed and Sealed this

Eighth Day of June, 1993

Attest:

MICHAEL K. KIRK

Attesting Officer

Acting Commissioner of Patents and Trademarks